(12) United States Patent
Matsuhana et al.

(10) Patent No.: US 11,662,322 B2
(45) Date of Patent: May 30, 2023

(54) X-RAY IMAGING APPARATUS

(71) Applicant: Shimadzu Corporation, Kyoto (JP)

(72) Inventors: Bunta Matsuhana, Kyoto (JP); Goro Kambe, Kyoto (JP); Futoshi Ueki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 76 days.

(21) Appl. No.: 17/388,450

(22) Filed: Jul. 29, 2021

(65) Prior Publication Data
US 2022/0170868 A1 Jun. 2, 2022

(30) Foreign Application Priority Data
Dec. 2, 2020 (JP) .............................. JP2020-200224

(51) Int. Cl.
*G01N 23/083* (2018.01)
*G21F 7/00* (2006.01)
*G01N 23/04* (2018.01)

(52) U.S. Cl.
CPC ........... *G01N 23/083* (2013.01); *G01N 23/04* (2013.01); *G21F 7/00* (2013.01); *G01N 2201/022* (2013.01)

(58) Field of Classification Search
CPC ................. G01N 23/083; G01N 23/04; G01N 2201/022; G01N 2223/30; G21F 7/00; H05G 1/28; H05G 1/54
See application file for complete search history.

(56) References Cited

U.S. PATENT DOCUMENTS

| | | | | |
|---|---|---|---|---|
| 3,679,908 A | * | 7/1972 | Mazza | H05B 6/6417 361/182 |
| 3,693,084 A | * | 9/1972 | Augustine | G02F 1/132 349/20 |
| 2011/0147603 A1 | * | 6/2011 | Ichizawa | G01T 1/185 250/389 |

FOREIGN PATENT DOCUMENTS

JP  2018-155561 A  10/2018

* cited by examiner

*Primary Examiner* — David P Porta
*Assistant Examiner* — Mamadou Faye
(74) *Attorney, Agent, or Firm* — Maier & Maier, PLLC

(57) ABSTRACT

An industrial X-ray imaging apparatus including: an X-ray source; an X-ray detector configured to detect X-rays emitted from the X-ray source; a stage which is disposed between the X-ray source and the X-ray detector and is configured to support a subject; and a shielding chamber configured to accommodate the X-ray source, the X-ray detector, and the stage, in which the shielding chamber includes a door for carrying in and out the subject, and a lock mechanism for prohibiting the door from changing to an open state, and in which the X-ray imaging apparatus further includes an unlocking control unit configured to control unlocking of the lock mechanism based on a leakage dose leaking from the shielding chamber to an outside.

4 Claims, 4 Drawing Sheets

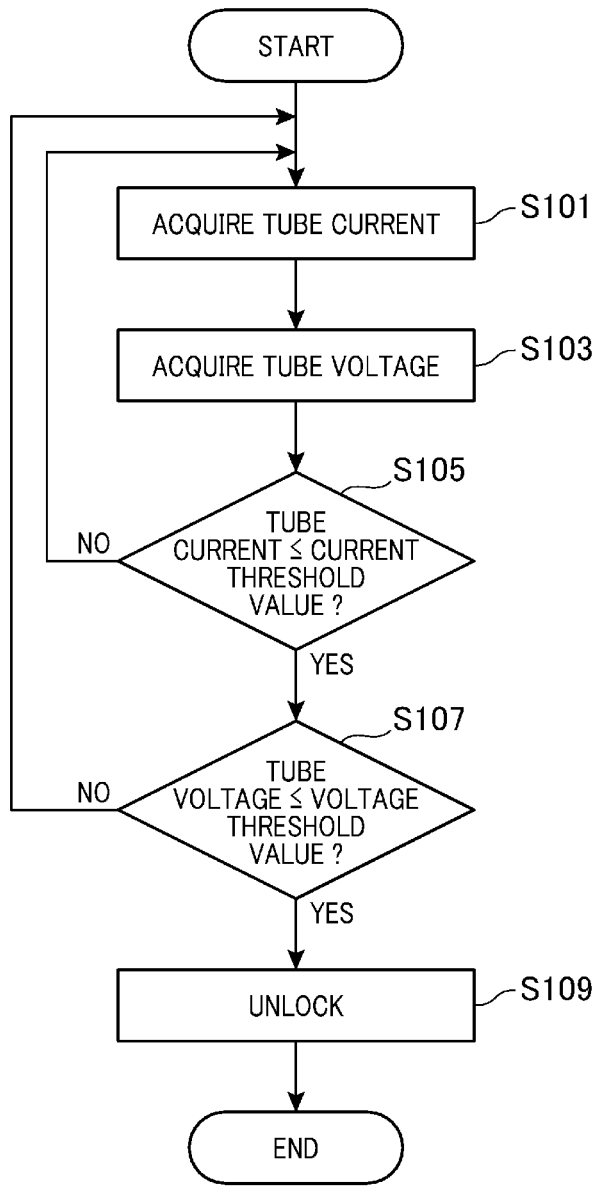

X-RAY IMAGING APPARATUS

INCORPORATION BY REFERENCE

The present application claims priority under 35 U.S.C. § 119 to Japanese Patent Application No. 2020-200224 filed on Dec. 2, 2020. The content of the application is incorporated herein by reference in its entirety.

BACKGROUND

The present invention relates to an X-ray imaging apparatus.

An X-ray imaging apparatus that images, using X-rays, an internal structure of an imaging object is known (See, for example, JP 2018-155561 A).

The X-ray imaging apparatus described in JP 2018-155561 A includes an X-ray source, an X-ray detector, and conveyance units which are disposed between the X-ray source and the X-ray detector and convey an imaging object. That is, the X-ray imaging apparatus is configured as a so-called "industrial X-ray imaging apparatus".

SUMMARY

However, since the imaging object is conveyed by the conveyance units described in JP 2018-155561 A, there is a case where the imaging object cannot be disposed at an appropriate position or in an appropriate posture. In such a case, a table on which the imaging object is placed is arranged instead of the conveyance units. In this case, a shielding chamber that accommodates the X-ray source, the table, and the X-ray detector is disposed. In addition, a door for carrying in and out the imaging object is disposed in the shielding chamber.

Further, a lock mechanism for prohibiting the door from changing to an open state is provided. When the X-ray generator emits X-rays, the door is locked by the lock mechanism. However, a specific method for unlocking the door locked by the lock mechanism at what timing is not disclosed.

When the unlocking of the door is too late, the workability of an operator is deteriorated. When the unlocking of the door is too early, the X-rays may leak to the outside to the shielding chamber.

An object of the present invention is to provide an X-ray imaging apparatus capable of unlocking a door disposed in a shielding chamber at an appropriate timing.

According to an aspect of the present invention, there is provided an X-ray imaging apparatus including: an X-ray source; an X-ray detector configured to detect X-rays emitted from the X-ray source; a stage which is disposed between the X-ray source and the X-ray detector and is configured to support an imaging object; and a shielding chamber configured to accommodate the X-ray source, the X-ray detector, and the stage, in which the shielding chamber includes a door for carrying in and out the imaging object, and a lock mechanism for prohibiting the door from changing to an open state, and in which the X-ray imaging apparatus further includes an unlocking control unit configured to control unlocking of the lock mechanism based on a leakage dose leaking from the shielding chamber to an outside.

According to the X-ray imaging apparatus of the aspect of the present invention, the unlocking of the lock mechanism is controlled based on the leakage dose leaking from the shielding chamber to the outside. Therefore, the door disposed in the shielding chamber can be unlocked at an appropriate timing. That is, it is possible to suppress deterioration of the workability of an operator and to suppress leakage of the X-rays to the outside of the shielding chamber.

BRIEF DESCRIPTION OF DRAWINGS

FIG. 4 is a flowchart illustrating an example of processing of an unlocking control unit.

DETAILED DESCRIPTION

Hereinafter, embodiments of the present invention will be described with reference to the drawings.

1. Configuration of Industrial X-Ray Imaging Apparatus

Figure 1:
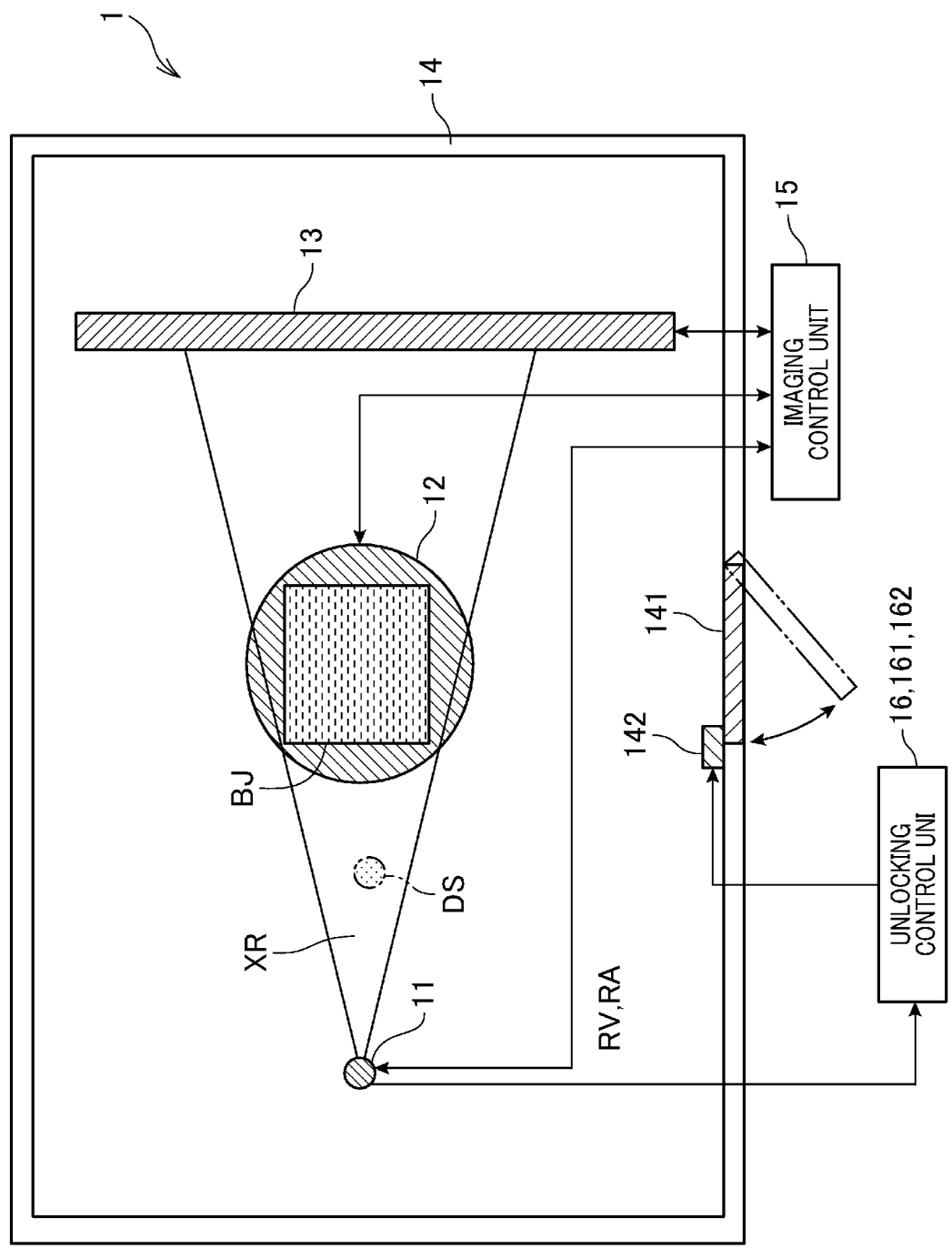
FIG. 1 is a plan view illustrating an example of a configuration of an industrial X-ray imaging apparatus according to the present embodiment.

FIG. 1 is a plan view illustrating an example of a configuration of an industrial X-ray imaging apparatus 1 according to the present embodiment.

As illustrated in FIG. 1, the industrial X-ray imaging apparatus 1 includes an X-ray source 11, a stage 12, an X-ray detector 13, an imaging control unit 15, and an unlocking control unit 16.

The X-ray source 11, the stage 12, and the X-ray detector 13 are accommodated in a shielding chamber 14.

In the following description, the industrial X-ray imaging apparatus 1 may be referred to as an X-ray imaging apparatus 1 for convenience.

The industrial X-ray imaging apparatus 1 corresponds to an example of an "X-ray imaging apparatus".

The X-ray source 11 radiates X-rays by being supplied with power from an X-ray power source unit, which is not illustrated, and irradiates a subject BJ placed on the stage 12 with X-rays. In the X-ray source 11, for example, a high voltage supplied from the X-ray power source unit is applied between a cathode 112 and a target 113 functioning as an anode. Electrons emitted from the cathode 112 collide with the target 113, which causes the target 113 to emit X-rays.

The cathode 112 and the target 113 will be described with reference to FIG. 2.

The stage 12 is disposed between the X-ray source 11 and the X-ray detector 13, and the subject BJ is placed thereon. The stage 12 is configured to be rotatable by, for example, a motor or the like.

The subject BJ corresponds to an example of an "imaging object".

The X-ray detector 13 captures an image of the X-rays emitted from the X-ray source 11 and generates a captured image P. The X-ray detector 13 includes, for example, a flat panel detector (FPD). The flat panel detector includes a two-dimensional image sensor in which a thin film layer including a scintillator that absorbs energy of X-rays and emits fluorescence is formed on a light receiving surface.

The imaging control unit 15 includes, for example, a processor and a memory, and executes a control program stored in the memory to cause the X-ray source 11 to emit X-rays toward the subject BJ to acquire the captured image P of the subject BJ generated by the X-ray detector 13.

The shielding chamber 14 accommodates the X-ray source 11, the stage 12, and the X-ray detector 13, and suppresses leakage of the X-rays to the outside. In the shielding chamber 14, a door 141 for carrying in and out the subject BJ, and a lock mechanism 142 for prohibiting the door 141 from changing from a closed state to an open state are disposed.

The lock mechanism 142 includes, for example, an electromagnetic lock. For example, the lock mechanism 142 prohibits the door 141 from changing from the closed state to the open state when an operator instructs generation of the captured image P. In addition, the lock mechanism 142 unlocks the door 141 as instructed by the unlocking control unit 16.

The unlocking control unit 16 instructs the lock mechanism 142 to unlock the door 141 based on a leakage dose LD leaking from the shielding chamber 14 to the outside.

The unlocking control unit 16 includes a processor 161 such as a central processing unit (CPU) or a micro-processing unit (MPU), and a memory device 162 such as a read only memory (ROM) or a random access memory (RAM). The memory device 162 stores a control program.

The processor 161 functions as the unlocking control unit 16 by executing the control program in the memory device 162.

The unlocking control unit 16 will be described with reference to FIGS. 2 to 4.

2. Positions of Tube Voltage and Tube Current Detection

Figure 2:
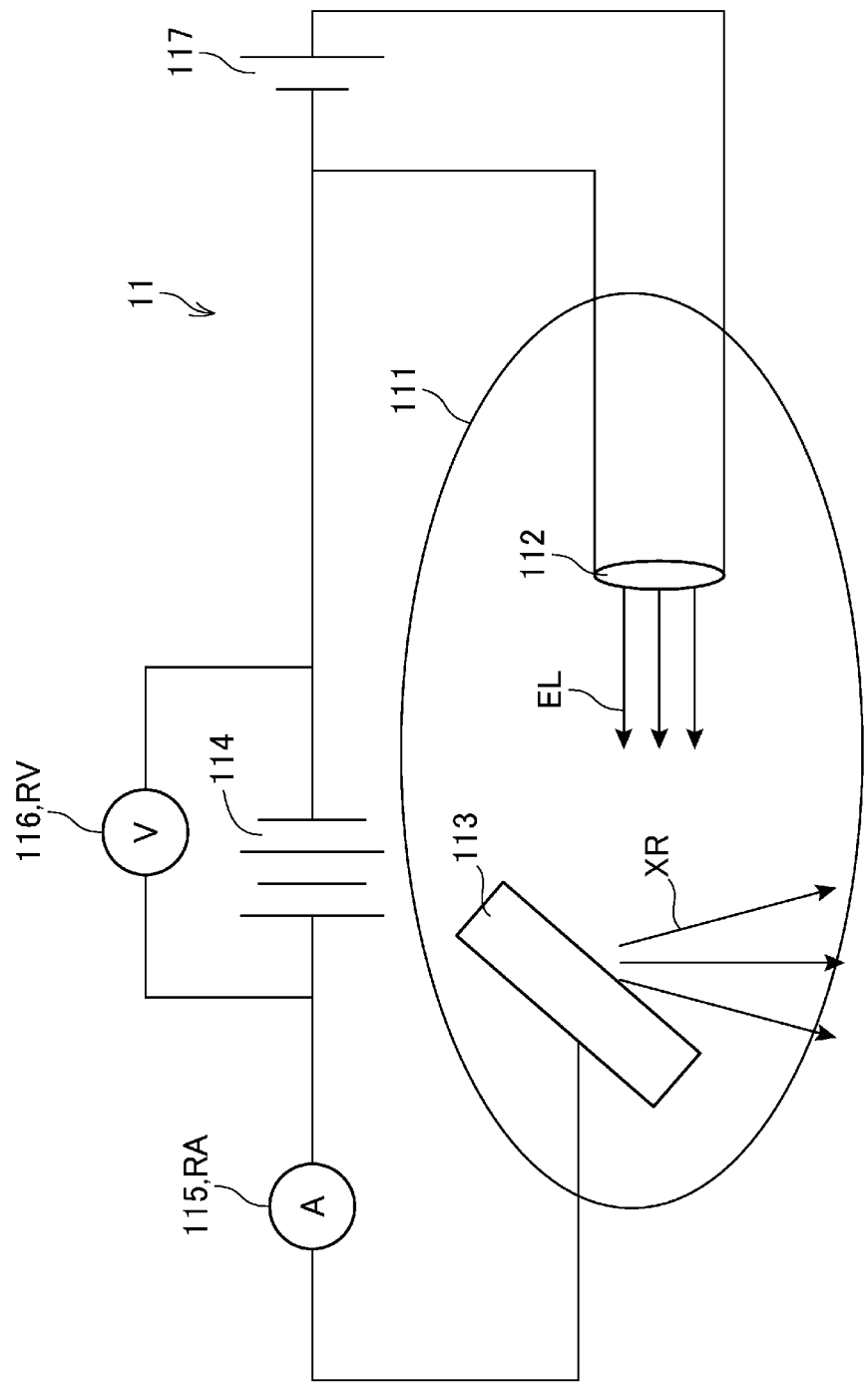
FIG. 2 is a diagram illustrating an example of positions where a tube voltage and a tube current are detected.

FIG. 2 is a diagram illustrating an example of positions where a tube voltage RV and a tube current RA are detected.

As illustrated in FIG. 2, the X-ray source 11 includes an X-ray tube 111, a first voltage source 114, a current sensor 115, a voltage sensor 116, and a second voltage source 117. The X-ray tube 111 includes the cathode 112 and the target 113.

The first voltage source 114 applies a voltage between the cathode 112 and the target 113 functioning as the anode. The second voltage source 117 applies a voltage to both ends of the cathode 112.

Electrons EL emitted from the cathode 112 are accelerated by the first voltage source 114 and collide with the target 113. The collision of the electrons EL with the target 113 causes the X-rays XR to be emitted from the target 113.

The current sensor 115 detects a current flowing between the target 113 and the first voltage source 114 as the tube current RA. The current sensor 115 outputs a signal indicating the tube current RA to the unlocking control unit 16.

The voltage sensor 116 detects a voltage across the first voltage source 114 as the tube voltage RV. The voltage sensor 116 outputs a signal indicating the tube voltage RV to the unlocking control unit 16.

The current sensor 115 and the voltage sensor 116 correspond to an example of a "detection unit".

The unlocking control unit 16 controls the unlocking of the lock mechanism 142 based on the tube voltage RV and the tube current RA.

In the present embodiment, the unlocking control unit 16 unlocks the lock mechanism 142 when the tube voltage RV is equal to or smaller than a voltage threshold value VS as well as the tube current RA is equal to or smaller than a current threshold value AS.

The voltage threshold value VS and the current threshold value AS will be described with reference to FIG. 3.

3. Voltage Threshold Value and Current Threshold Value

Figure 3:
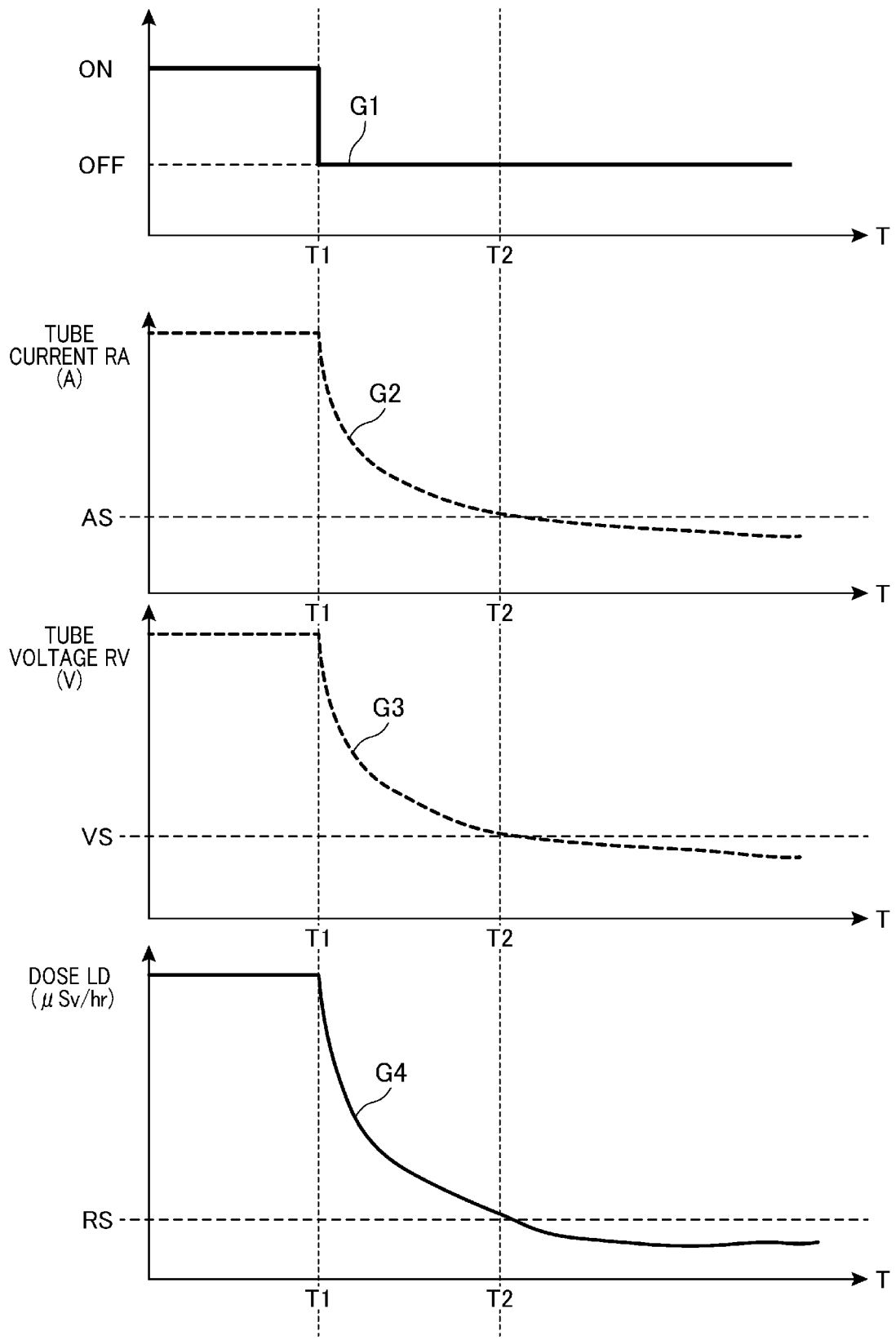
FIG. 3 is a graph showing an example of changes in the tube voltage, the tube current, and a leakage dose when an X-ray source is turned off.

FIG. 3 is a graph showing an example of changes in the tube current RA, the tube voltage RV, and the leakage dose LD when the X-ray source 11 is turned off.

The horizontal axes of the four graphs illustrated in FIG. 3 each indicate time T. In addition, the vertical axes of the four graphs shown in FIG. 3 indicate ON/OFF of the X-ray source, the tube current RA, the tube voltage RV, and the leakage dose LD in order from the top.

As indicated by a graph G1 located at the top in FIG. 3, the X-ray source 11 changes from ON to OFF at a time T1.

As indicated by a graph G2 located second from the top in FIG. 3, the tube current RA decreases from the time T1 by drawing a curve convex downward.

As indicated by a graph G3 located third from the top in FIG. 3, the tube voltage RV decreases from the time T1 by drawing a curve convex downward.

As indicated by a graph G4 located at the bottom in FIG. 3, the leakage dose LD decreases from the time T1 by drawing a curve convex downward. In the present embodiment, the leakage dose LD indicated by the graph G4 indicates a dose measured by disposing a dose sensor DS in the X-ray irradiation region XR as illustrated in FIG. 1.

As indicated by the graph G4, the leakage dose LD reaches a dose threshold value RS at a time T2. Then, after the time T2, the leakage dose LD monotonously decreases to be equal to or smaller than the dose threshold value RS.

As indicated by the graph G2, the tube current RA reaches the current threshold value AS at the time T2. Then, after the time T2, the tube current RA monotonously decreases to be equal to or smaller than the current threshold value AS.

As indicated by the graph G3, the tube voltage RV reaches the voltage threshold value VS at the time T2. Then, after the time T2, the tube voltage RV monotonously decreases to be equal to or smaller than the voltage threshold value VS.

The dose threshold value RS is determined based on an exposure dose limit DL. Hereinafter, the exposure dose limit DL will be described.

In "Regarding the enforcement of the ministerial ordinance to revise part of the Ordinance on Industrial Safety and Health, and the Ordinance on Prevention of Ionizing Radiation Hazards" dated Mar. 30, 2001, that is, in (2) of "3 Re: Article 3" in "III. Detailed Matters" in "Labour Standards Bureau Notification No. 253", it is stipulated that 'it is desirable that the effective dose for the worker for one year does not exceed a public exposure dose limit of "1 mSv" per year'.

On the other hand, the Ordinance on Prevention of Ionizing Radiation Hazards defines 1 year as 50 weeks, and the Labor Standards Act defines the working hours as 40 hours/week.

Therefore, according to the following equation (1), the exposure dose limit DL is desirably 0.5 pSv/Hr or smaller.

$$DL(\mu Sv/Hr) \leq 1(mSv)/50/40 \times 1000 \qquad (1)$$

Although FIG. 3 shows an example of the changes in the tube voltage RV, the tube current RA, and the leakage dose LD when the X-ray source 11 is turned off, the tube voltage RV and the tube current RA are determined according to the subject BJ. Therefore, in the X-ray imaging apparatus 1, it is preferable to determine the current threshold value AS, the voltage threshold value VS, and the dose threshold value RS based on the leakage dose LD corresponding to the tube voltage RV and the tube current RA determined according to the subject BJ and on the exposure dose limit DL.

4. Processing of Unlocking Control Unit

FIG. 4 is a flowchart illustrating an example of processing of the unlocking control unit 16.

In FIG. 4, a case where the current threshold value AS and the voltage threshold value VS are determined in advance will be described. In FIG. 4, a case where the lock mechanism 142 locks the door 141 in a closed state in advance will be described.

First, in Step S101, the unlocking control unit 16 acquires the tube current RA from the current sensor 115.

Next, in Step S103, the unlocking control unit 16 acquires the tube voltage RV from the voltage sensor 116.

Next, in Step S105, the unlocking control unit 16 determines whether or not the tube current RA is equal to or smaller than the current threshold value AS.

When the unlocking control unit 16 determines that the tube current RA is not equal to or smaller than the current threshold value AS (Step S105; NO), the processing returns to Step S101. When the unlocking control unit 16 determines that the tube current RA is equal to or smaller than the current threshold value AS (Step S105; YES), the processing proceeds to Step S107.

Then, in Step S107, the unlocking control unit 16 determines whether or not the tube voltage RV is equal to or smaller than the voltage threshold value VS.

When the unlocking control unit 16 determines that the tube voltage RV is not equal to or smaller than the voltage threshold value VS (Step S107; NO), the processing returns to Step S101. When the unlocking control unit 16 determines that the tube voltage RV is equal to or smaller than the voltage threshold value VS (Step S107; YES), the processing proceeds to Step S109.

Then, in Step S109, the unlocking control unit 16 unlocks the lock mechanism 142. Thereafter, the processing ends.

In this manner, when the tube current RA is equal to or smaller than the current threshold value AS as well as the tube voltage RV is equal to or smaller than the voltage threshold value VS, the unlocking control unit 16 unlocks the lock mechanism 142. Therefore, the door 141 can be unlocked at an appropriate timing, by appropriately setting the current threshold value AS and the voltage threshold value VS. That is, it is possible to suppress deterioration of the workability of an operator and to suppress leakage of the X-rays to the outside of the shielding chamber.

5. Embodiments and Effects

It is understood, by those skilled in the art, that the above-described embodiment is a specific example of the following aspects.

(Item 1)

According to an aspect, there is provided an X-ray imaging apparatus including: an X-ray source; an X-ray detector configured to detect X-rays emitted from the X-ray source; a stage which is disposed between the X-ray source and the X-ray detector and is configured to support an imaging object; and a shielding chamber configured to accommodate the X-ray source, the X-ray detector, and the stage, in which the shielding chamber includes a door for carrying in and out the imaging object, and a lock mechanism for prohibiting the door from changing to an open state, and in which the X-ray imaging apparatus further includes an unlocking control unit configured to control unlocking of the lock mechanism based on a leakage dose leaking from the shielding chamber to an outside.

According to the X-ray imaging apparatus described in Item 1, the unlocking control unit controls the unlocking of the lock mechanism based on the leakage dose.

Therefore, the lock mechanism can be unlocked at an appropriate timing. That is, it is possible to suppress deterioration of the workability of an operator and to suppress leakage of the X-rays to the outside of the shielding chamber.

(Item 2)

The X-ray imaging apparatus described in Item 1 further includes a detection unit configured to detect a tube voltage of the X-ray source and a tube current of the X-ray source, and the unlocking control unit controls unlocking of the lock mechanism based on at least one of the tube voltage and the tube current.

According to the X-ray imaging apparatus described in Item 2, the unlocking control unit controls the unlocking of the lock mechanism based on at least one of the tube voltage and the tube current.

Therefore, the lock mechanism can be unlocked at an appropriate timing. That is, it is possible to suppress deterioration of the workability of an operator and to suppress leakage of the X-rays to the outside of the shielding chamber.

(Item 3)

In the X-ray imaging apparatus described in Item 2, the unlocking control unit unlocks the lock mechanism when the tube voltage is equal to or smaller than a voltage threshold value as well as the tube current is equal to or smaller than a current threshold value.

According to the X-ray imaging apparatus described in Item 3, the unlocking control unit unlocks the lock mechanism when the tube voltage is equal to or smaller than the voltage threshold value as well as the tube current is equal to or smaller than the current threshold value.

Therefore, the lock mechanism can be unlocked at an appropriate timing, by setting the voltage threshold value and the current threshold value to appropriate values. That is, it is possible to suppress deterioration of the workability of an operator and to suppress leakage of the X-rays to the outside of the shielding chamber.

(Item 4)

In the X-ray imaging apparatus described in Item 3, the voltage threshold value and the current threshold value are set such that the leakage dose is equal to or smaller than a dose threshold value.

According to the X-ray imaging apparatus described in Item 4, the voltage threshold value and the current threshold value are set such that the leakage dose is equal to or smaller than the dose threshold value.

Therefore, the voltage threshold value and the current threshold value can be set to appropriate values, by setting the dose threshold value to an appropriate value. Therefore, the lock mechanism can be unlocked at an appropriate timing. That is, it is possible to suppress deterioration of the workability of an operator and to suppress leakage of the X-rays to the outside of the shielding chamber.

(Item 5)

In the X-ray imaging apparatus described in Item 4, the dose threshold value is determined based on an exposure dose limit.

According to the X-ray imaging apparatus described in Item 5, the dose threshold value is determined based on the exposure dose limit.

Therefore, the dose threshold value can be set to an appropriate value. Therefore, the voltage threshold value and the current threshold value can be set to appropriate values. As a result, the lock mechanism can be unlocked at an appropriate timing. That is, it is possible to suppress deterioration of the workability of an operator and to suppress leakage of the X-rays to the outside of the shielding chamber.

6. Other Embodiments

The industrial X-ray imaging apparatus 1 according to the present embodiment is merely an example of an aspect of the "X-ray imaging apparatus", and can be optionally modified and applied without departing from the gist of the present invention.

In the present embodiment, although the case where one door 141 is disposed in the shielding chamber 14 has been described, the present invention is not limited thereto. A plurality of doors may be disposed in the shielding chamber 14.

In the present embodiment, although the case where the lock mechanism 142 includes the electromagnetic lock has been described, the present invention is not limited thereto. The lock mechanism 142 is only required to unlock the door 141 as instructed by the unlocking control unit 16.

In the present embodiment, although the case where the unlocking control unit 16 controls the unlocking of the lock mechanism 142 based on the tube voltage RV and the tube current RA has been described, the present invention is not limited thereto. The unlocking control unit 16 is only required to control the unlocking of the lock mechanism 142 based on at least one of the tube voltage RV and the tube current RA.

In the present embodiment, when the tube current RA is equal to or smaller than the current threshold value AS as well as the tube voltage RV is equal to or smaller than the voltage threshold value VS, the unlocking control unit 16 unlocks the lock mechanism 142, but the present invention is not limited thereto. For example, in a case where the following equation (2) is satisfied, the unlocking control unit 16 may unlock the lock mechanism 142.

$$F(RA, RV) \leq FS \quad (2)$$

The function F (RA, RV) is a function of the tube current RA and the tube voltage RV, and a function threshold value FS defines a condition under which the unlocking control unit 16 unlocks the lock mechanism 142.

As the function F (RA, RV), for example, the following equation (3) is preferable.

$$F(RA, RV) = RA^n \times RV \quad (3)$$

The power n is, for example, 2 to 4.

In the present embodiment, although the case where the unlocking control unit 16 is configured separately from the imaging control unit 15 has been described, the present invention is not limited thereto. The unlocking control unit 16 may be configured integrally with the imaging control unit 15. That is, the processor 161 may function as the unlocking control unit 16 and the imaging control unit 15 by executing a control program stored in the memory device.

In addition, each functional unit illustrated in FIG. 1 indicates a functional configuration, and a specific implementation form is not particularly limited. That is, hardware individually corresponding to each functional unit does not necessarily need to be mounted, and it is of course possible to employ a configuration in which functions of a plurality of functional units are realized by one processor executing a program. In addition, some of the functions implemented by software in the above embodiment may be implemented by hardware, or some of the functions implemented by hardware may be implemented by software.

In addition, the processing unit of the flowchart illustrated in FIG. 4 is divided according to main processing contents in order to facilitate understanding of the processing of the unlocking control unit 16. There is no limitation in the way of dividing or the name of the processing unit illustrated in the flowchart of FIG. 4, and the processing unit can be divided into more processing units according to the processing content. Alternatively, it is possible to divide the processing unit in a manner in which one processing unit includes more processing. In addition, the processing order in the above flowchart is not limited to the illustrated example.

In addition, the unlocking control unit 16 illustrated in FIG. 1 can be realized by causing the processor 161 included in the unlocking control unit 16 to execute the control program. The control program can also be recorded in a computer-readable recording medium. As the recording medium, a magnetic or optical recording medium or a semiconductor memory device can be used. Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium. Furthermore, the recording medium may be a non-volatile storage device such as a RAM, a ROM, or an HDD which is an internal storage device included in the unlocking control unit 16. In addition, the control program may be stored in a server device or the like, and the control program may be downloaded from the server device to the unlocking control unit 16.

REFERENCE SIGNS LIST

1 Industrial X-ray imaging apparatus (X-ray imaging apparatus)
11 X-ray source
111 X-ray tube
112 Cathode
113 Target
114 First voltage source
115 Current sensor (part of detection unit)
116 Voltage sensor (part of detection unit)
117 Second voltage source
12 Stage
13 X-ray detector
14 Shielding chamber
141 Door
142 Lock mechanism
15 Imaging control unit
16 Unlocking control unit
161 Processor
162 Memory device
AS Current threshold value
EL Electron
DL Exposure dose limit
LD Leakage dose
RA Tube current
RS Dose threshold value
RV Tube voltage
VS Voltage threshold value
XR X-ray

What is claimed is:

1. An X-ray imaging apparatus comprising:
   an X-ray source;
   an X-ray detector configured to detect X-rays emitted from the X-ray source;
   a stage which is disposed between the X-ray source and the X-ray detector and is configured to support an imaging object;
   a shielding chamber configured to accommodate the X-ray source, the X-ray detector, and the stage, wherein the shielding chamber includes a door for carrying in and out the imaging object;
   a lock mechanism for prohibiting the door from changing to an open state;
   a sensor configured to detect at least one of a tube voltage of the X-ray source and a tube current of the X-ray source; and
   a controller configured to control unlocking of the lock mechanism based on at least one of the tube voltage and the tube current.

2. The X-ray imaging apparatus according to claim 1 wherein
   the controller unlocks the lock mechanism when the tube voltage is equal to or smaller than a voltage threshold value as well as when the tube current is equal to or smaller than a current threshold value.

3. The X-ray imaging apparatus according to claim 2, wherein
   the voltage threshold value and the current threshold value are set such that a leakage dose is equal to or smaller than a dose threshold value.

4. The X-ray imaging apparatus according to claim 3, wherein
   the dose threshold value is determined based on an exposure dose limit.

* * * * *